United States Patent Office 2,920,074
Patented Jan. 5, 1960

2,920,074

1-(5-NITROFURFURYLIDENEAMINO)-2-IMIDAZOLIDINETHIONE

Julian G. Michels, Norwich, N.Y., assignor to The Norwich Pharmacal Company, Norwich, N.Y., a corporation of New York No Drawing. Application June 19, 1958
Serial No. 742,985

1 Claim. (Cl. 260—240)

This invention relates to a new chemical compound 1-(5-nitrofurfurylideneamino)-2-imidazolidinethione represented by the formula:

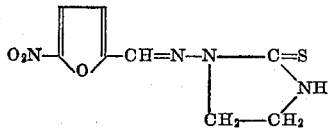

I have discovered that this new compound is distinguished by the high order of chemotherapeutic activity which it exhibits in preventing and treating a broad spectrum of parasitic infections in poultry and animals when administered orally in far less than toxic amounts. It is peculiarly valuable as a prophylactic in combatting infections caused by *Ascaridia galli* (round worm) in poultry. This organism, which has been unusually resistant to treatment in the past, is the causative agent of a common parasitic disease in chickens; it inhibits their growth; impedes proper bone development; and often causes death. When my new compound is incorporated in poultry food, it is highly effective in preventing infections by this parasite. My new compound is also useful in combatting infections in poultry caused by *Pasteurella multocida* and *Eimeria tenella*. It has also exhibited effectiveness in treating animals lethally infected with *Erysipelothrix rhusiopathiae*, *Micrococcus pyogenes* var. *aureus* and *Salmonella typhosa*.

My compound is relatively non-toxic. It is tolerated by mice at a level of 2200 mg./kg. When incorporated in the feed supply of chickens at a concentration of 0.022% and that feed eaten for a period of 30 days, no manifestations of toxicity are noted.

My new compound is easily compounded in accordance with acceptable pharmaceutical practice in the form of tablets, gelatin capsules, and suspensions. It may be incorporated in the feed supply of animals at levels ranging from about 0.01% to about 0.05%.

In order that my invention may be readily available to those skilled in the art, a method for preparing it is described briefly:

EXAMPLE

*1-(5-nitro-2-furfurylideneamino)-2-imidazolidinethione*

To a mixture of 1100 cc. of 2 N sulfuric acid and 400 cc. of dioxane was added 40.7 gm. (0.4 mole) of recrystallized ethylenethiourea. During about one hour a solution of 27.5 gm. (0.4 mole) of sodium nitrite in 100 cc. of water was added at about 0° C. Yellow crystals appeared in about 45 minutes. After stirring for about 30 minutes at 0° C., 60 gm. of zinc dust was added during 15 minutes so that the temperature did not exceed 10° C. Stirring was continued for about ten minutes. The excess zinc was filtered and the filtrate treated with a solution of 50 gm. of 5-nitro-2-furfural in 500 cc. of ethyl alcohol. The precipitated product was filtered, washed with water, ethyl alcohol and ether and dried at 110° C. There was obtained 35.5 gm. (37%) of 1-(5-nitrofurfurylideneamino)-2-imidazolidinethione. Recrystallization from about 1.5 liters of nitromethane in two portions, recycling the mother liquor, gave 24.8 gm. of purified product decomposing when heated above 225° C. Evaporation and cooling of the mother liquid gave an additional 2.9 gm. of product.

What I claim is:

The chemical compound 1-(5-nitrofurfurylideneamino)-2-imidazolidinethione represented by the formula:

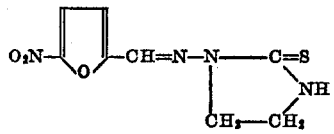

References Cited in the file of this patent

UNITED STATES PATENTS

| | | |
|---|---|---|
| 2,610,181 | Hays | Sept. 9, 1952 |
| 2,746,960 | Gever et al. | May 22, 1956 |
| 2,776,979 | Michels | Jan. 8, 1957 |